US011896940B2

(12) United States Patent
Mazrooee et al.

(10) Patent No.: US 11,896,940 B2
(45) Date of Patent: Feb. 13, 2024

(54) VOLUMETRIC CONTROL FOR PROPPANT CONCENTRATION IN HYDRAULIC FRACTURING

(71) Applicant: Halliburton Energy Services, Inc., Houston, TX (US)

(72) Inventors: Mehdi Mazrooee, Double Oak, TX (US); Michael Linley Fripp, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 679 days.

(21) Appl. No.: 16/972,122

(22) PCT Filed: Jul. 31, 2018

(86) PCT No.: PCT/US2018/044549
§ 371 (c)(1),
(2) Date: Dec. 4, 2020

(87) PCT Pub. No.: WO2020/027796
PCT Pub. Date: Feb. 6, 2020

(65) Prior Publication Data

US 2021/0229049 A1 Jul. 29, 2021

(51) Int. Cl.

| | |
|---|---|
| ***B01F 23/50*** | (2022.01) |
| ***E21B 43/26*** | (2006.01) |
| ***B01F 35/21*** | (2022.01) |
| ***B01F 35/22*** | (2022.01) |
| ***B01F 35/221*** | (2022.01) |
| *E21B 43/267* | (2006.01) |
| *B01F 101/49* | (2022.01) |

(52) U.S. Cl.
CPC .............. *B01F 23/51* (2022.01); *B01F 23/59* (2022.01); *B01F 35/2134* (2022.01); *B01F 35/21112* (2022.01); *B01F 35/2203* (2022.01); *B01F 35/2217* (2022.01); *E21B 43/2607* (2020.05); *B01F 2101/49* (2022.01); *E21B 43/267* (2013.01)

(58) Field of Classification Search
CPC ............................ B01F 23/51; E21B 43/2607
USPC ...................................................... 366/152.2
See application file for complete search history.

(56) References Cited

U.S. PATENT DOCUMENTS 5,054,554 A 10/1991 Pearson
5,281,023 A * 1/1994 Cedillo .................. B01F 35/82 366/20

(Continued)

FOREIGN PATENT DOCUMENTS

WO 2020027796 A1 2/2020

*Primary Examiner* — David L Sorkin
(74) *Attorney, Agent, or Firm* — John Wustenberg; Parker Justiss, P.C.

(57) ABSTRACT

Methods and systems for controlling proppant concentration in a hydraulic fracturing slurry include measuring volumetric flow rates of fracturing fluid input to a blender and hydraulic fracturing slurry output from the blender, using these measured values to calculate a volumetric flow rate of proppant input, a slurry density and/or a slurry volume fraction, adjusting first and second valves to control rates of fluid and proppant delivery to the blender and re-measuring the volumetric flow rates and recalculating until target values of volumetric flow rate of proppant input, slurry density and/or slurry volume fraction are achieved.

20 Claims, 6 Drawing Sheets

(56) References Cited

U.S. PATENT DOCUMENTS

| | | | | |
|---|---|---|---|---|
| 5,452,954 | A * | 9/1995 | Handke ..................... | B28C 7/02 366/152.5 |
| 7,494,263 | B2 * | 2/2009 | Dykstra ................ | B01F 35/213 700/285 |
| 7,561,943 | B2 | 7/2009 | Dykstra et al. | |
| 7,567,856 | B2 | 7/2009 | Dykstra et al. | |
| 7,620,481 | B2 | 11/2009 | Dykstra | |
| 2006/0144163 | A1 | 7/2006 | Dutton et al. | |
| 2010/0046316 | A1 | 2/2010 | Hughes et al. | |
| 2015/0060065 | A1 | 3/2015 | Scharmach et al. | |
| 2016/0265330 | A1 | 9/2016 | Mazrooee et al. | |
| 2018/0163528 | A1 | 6/2018 | Smith et al. | |
| 2019/0009232 | A1 * | 1/2019 | Yeung ................. | B01F 35/2144 |

* cited by examiner

VOLUMETRIC CONTROL FOR PROPPANT CONCENTRATION IN HYDRAULIC FRACTURING

CROSS-REFERENCE TO RELATED APPLICATION

This application is the National Stage of, and therefore claims the benefit of, International Application No. PCT/US2018/044549 filed on Jul. 31, 2018, entitled "VOLUMETRIC CONTROL FOR PROPPANT CONCENTRATION IN HYDRAULIC FRACTURING," which was published in English under International Publication Number WO 2020/027796 on Feb. 6, 2020. The above application is commonly assigned with this National Stage application and is incorporated herein by reference in its entirety.

BACKGROUND

In the oil and gas industry, unconventional reservoirs often have a low-permeability rock matrix that impedes fluid flow, making it difficult to extract hydrocarbons (or other fluids of interest) at commercially-feasible rates and volumes. The effective permeability of the formation can be increased by hydraulic fracturing. Blending systems mix sand or other proppants with fracturing fluids to form a slurry added at a desired inlet downhole flow rate downhole with the goal of keeping the fractures open after the fluid pressure is removed. Often these blending systems use open-loop mixing using a sand-screw to control the proppant concentration in the slurry.

BRIEF DESCRIPTION

Figure 1:
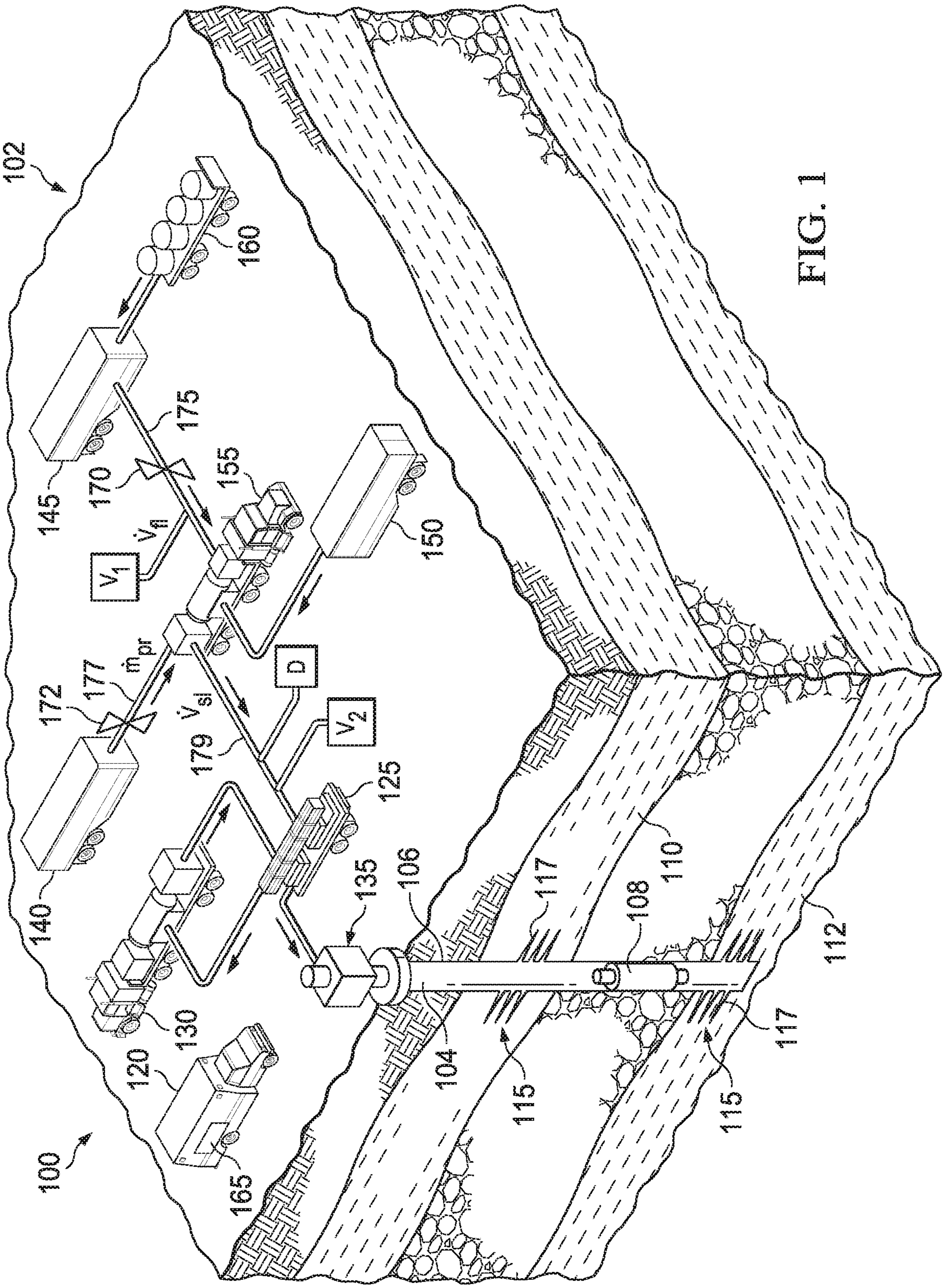
Figure 2A:
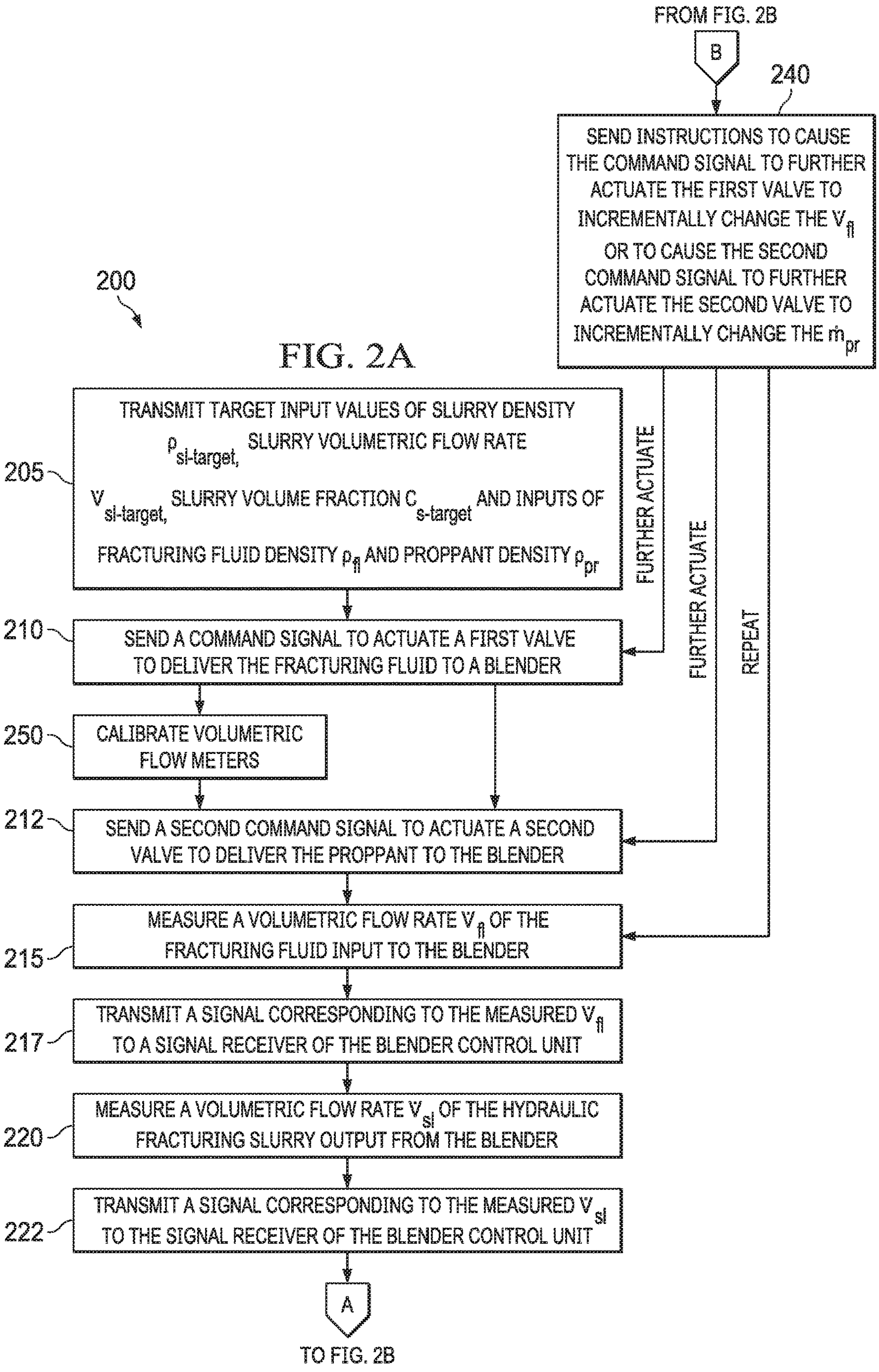
Figure 2B:
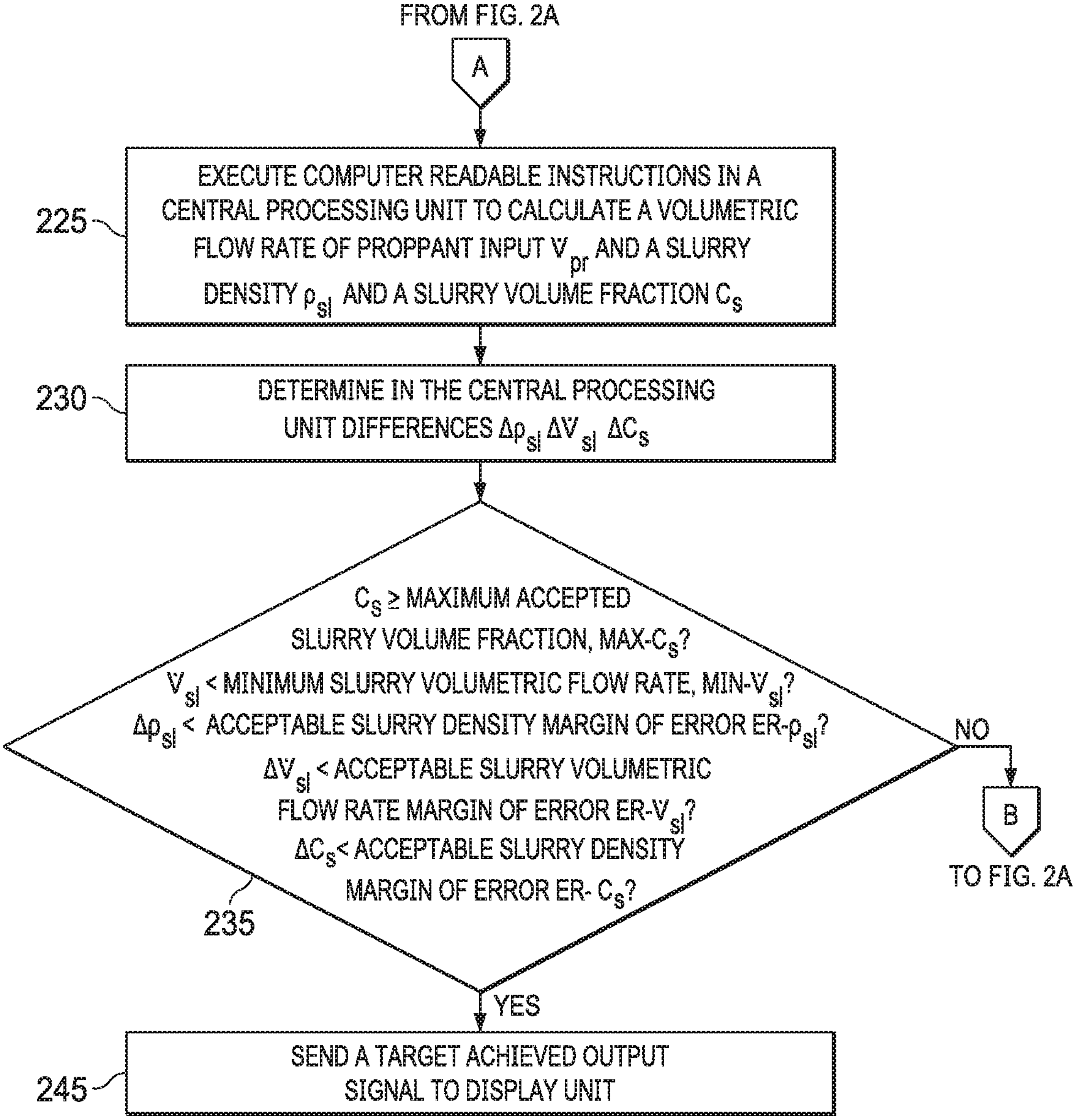
Figure 3A:
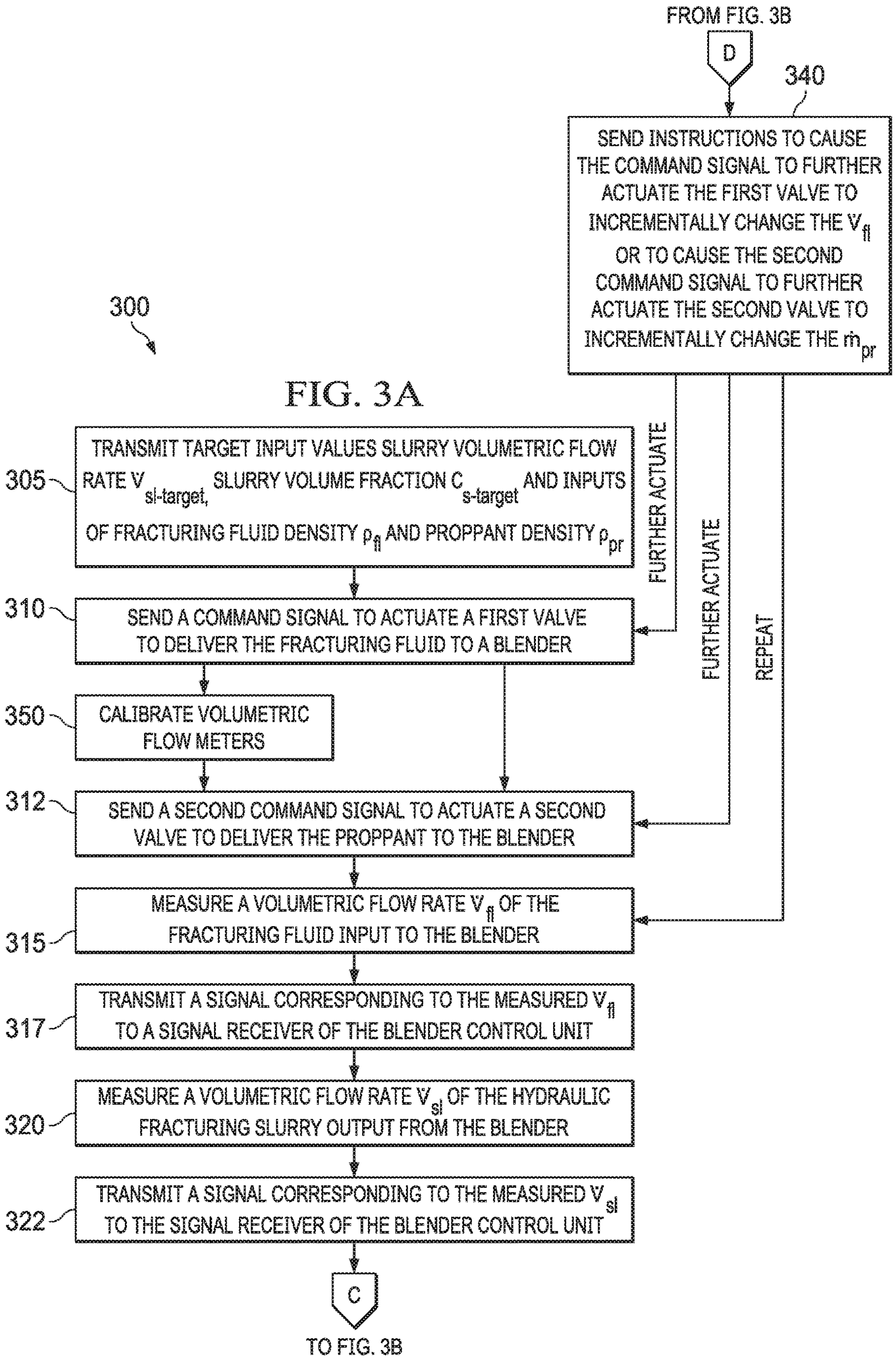
Figure 3B:
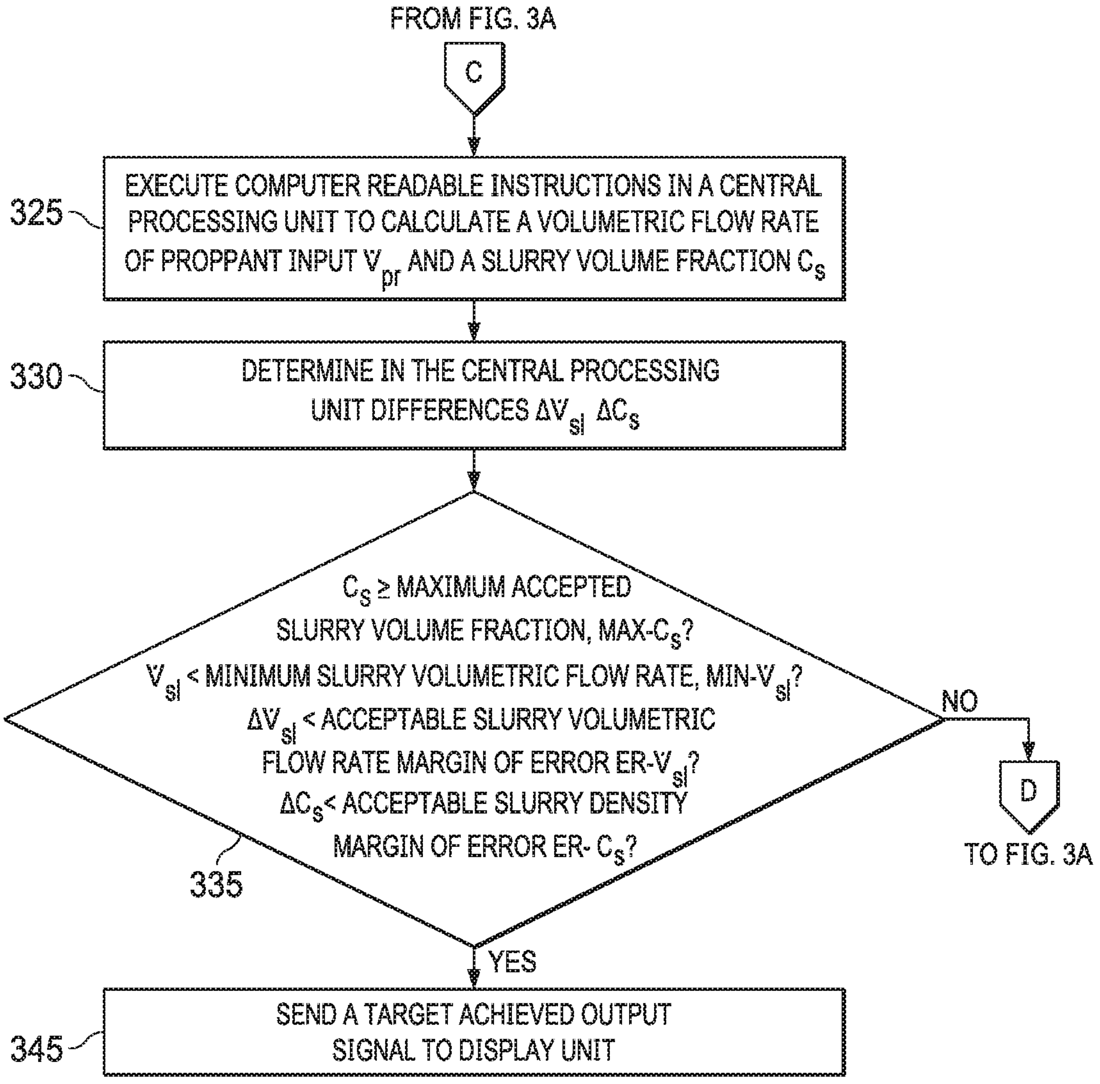
Figure 4:
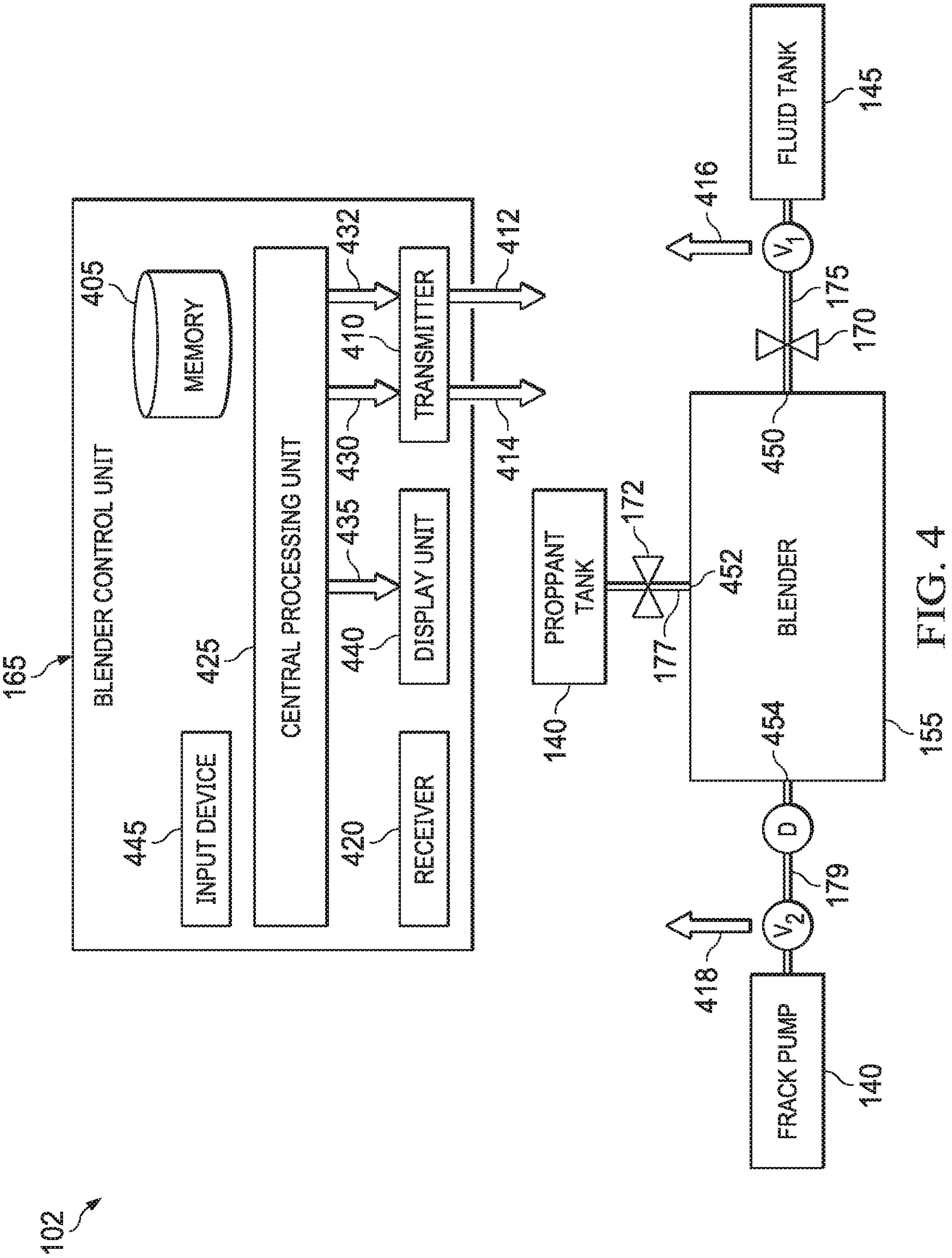

Reference is now made to the following descriptions taken in conjunction with the accompanying drawings, in which:

FIG. 1 presents a schematic, perspective view, with a portion in cross-section, of an illustrative embodiment of a hydraulic fracturing well system including a blending system for controlling the proppant concentration accordance embodiments of the disclosure;

FIGS. 2A and 2B present a schematic flowchart of an illustrative embodiment of a method for controlling the proppant concentration in the output from a blending system of a hydraulic fracturing well system;

FIGS. 3A and 3B present a schematic flowchart of an illustrative embodiment of another method for controlling the proppant concentration in the output from a blending system of a hydraulic fracturing well system; and FIG. 4 presents a schematic block diagram of an illustrative embodiment of a blending system for controlling the proppant concentration.

DETAILED DESCRIPTION

As part of the present invention we recognized that volumetric control feedback to control the proppant concentration generated from a blending system provides more robust, reliable and cheaper feedback control than certain existing mass control feedback mechanisms using a sensed density to measure the density of the slurry and a density observer for the control of that density. Also as part of the present invention, we discovered that density sensors used for mass control feedback can be unreliable, prone to failure and have a lag in the time response (e.g., 30 second or greater lag times) which in turn deters from their use for feedback control.

For instance, the bulk density of a proppant can be less than 3, 2 or 1.5 times the density of the fluid and we have found that as the density of the proppant gets closer to the density of the fluid, a density sensor has increasing trouble distinguishing the amount of proppant in the fluid. We found that if the density of the proppant exactly matched the density of the fluid, then adding more proppant would not change the density of the slurry. In such cases, we found that measuring the volume change to be more accurate than measuring the density change when the density of the proppant approaches the density of the fluid.

As further disclosed below for embodiments of the disclosure, we have developed a method of estimating the volume of proppant solids addition by measuring the volume flow rate of blender inlet fluid and then measuring the blender outlet volume, the difference between the inlet volume and the outlet volume being the volume of added proppant solids. We have further developed a method of calculating the proppant solids volume and then calculating the slurry density by multiplying the proppant solids volume and the liquids volume by the known proppant solid's density and the known fracturing fluid's density, and, calculating a desired slurry flow rate and desired fluid flow rate based on the desired slurry density, the desired slurry rate, the density of the proppant, and the density of the inlet fluid. As such, volumetric control feedback, e.g., as implemented by a blender control unit, can be achieved by measuring a volume flow rate of inlet fluid and a volume flow rate of outlet slurry and using the difference between the desired slurry rate and the desired inlet fluid rate to control the inlet fluid rate and the added proppant solids.

Additionally, embodiments of our system can advantageously eliminate the use of a mixing vessel, which we believe has the potential to result in control instability when only the inlet flow rate and the outlet flow rate are being measured. The mixing behavior in a mixing vessel could potentially complicate the accuracy of these flow rate measurements. As further disclosed below for embodiments of the disclosure, instead of a mixing vessel, the constituent proppants and fluid can be mixed in a direct flow pathway, e.g., using conduits and pumps, without the need for a mixing vessel.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings, with the understanding that they serve as examples and that they do not limit the disclosure to only the illustrated embodiments. Moreover, it is fully recognized that the different teachings of the embodiments discussed, infra, may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

FIG. 1 presents a schematic, perspective view, with a portion in cross-section, of an illustrative embodiment of a hydraulic fracturing well system 100 for controlling the proppant concentration in the output by a blending system 102 configured in accordance with embodiments of the disclosure.

The wellbore 104 can include a casing 106 that is cemented or otherwise secured to the wellbore wall. The wellbore 104 can be uncased or include uncased sections. A frac plug tool 108 can be positioned in the wellbore 104 to isolate discrete subterranean formation intervals 110, 112 for different fracture stages that have been identified or reached and a hydraulic fracturing operation may be used to create fractures 115 in the intervals 110, 112 to increase formation porosity for increasing the fluid conductivity of flow paths 117 between the formation intervals 110, 112 and the wellbore 104 to increase oil or gas production. Perforations can be formed in the casing 106 to allow fracturing fluids or slurries to flow into formation intervals 110, 112. The fracturing well system 100 can include, among other things, an operation control unit 120, a manifold unit 125, a frack pump 130 (e.g., a fracturing-fluid pumping truck), and a wellhead tree 135 to cap the wellbore 104. The blending system 102 can be configured to combine cement compositions, hydrated gel, fracturing fluids and proppants (e.g., sand or other fracturing additives). The blending system 102 can include one or more of the following: proppant storage tank 140, fracturing fluid tank 145, other fracking component storage tank 150, and blender 155 (e.g. one or more blending trucks). A hydration apparatus 160 can be coupled to the blending system 102 (e.g., via fluid tank 145).

One skilled in the pertinent art would understand how fracturing fluid, pumped into the wellbore 104 at a high rate to increase the pressure in the wellbore 104, could be used as part of the system 100 to create or increase fractures 115 in the formation intervals 110, 112. For instance, the fracturing fluid, including a cement composition or a hydrated gel, and/or resins (e.g., epoxy or other polymer resins) or composites thereof, can be pumped alone or as a slurry mixture with proppants into the fractures 115 to prop the fractures in the formation open, to thereby, effectively increase the formation's porosity. One skilled in the pertinent art would understand how it would be desirable, to optimize the oil and gas extraction, to alter the composition of fracturing fluids and/or the proportion of proppants in slurry mixtures at different stages of hydraulic fracturing treatment using the system 100.

The operation control unit 120 can be configured to coordinate the hydraulic fracturing operation, including the operation of the blending system 102 components, and the frack pump 130, to deliver the fracturing fluid or slurry to the wellbore 104. The operation control unit 120 can be communication with the blending system 102 components and the frack pump 130 to record monitored flow rates (e.g., volumetric flow rates $\dot{V}_1$ and $\dot{V}_2$, measured via flow rate sensors $V_1$ and $V_2$, respectively) and pressures associated with the blending system 102 components and the frack pump 130 as well as the manifold unit 120 and the wellhead tree 135.

As further discussed herein in the context of FIGS. 2-4, in some embodiments a blender control unit 165 of the operation control unit 120 can be configured to control the delivery rates of proppants (e.g., proppant mass flow rate, $\dot{m}_p$), fluids (fracking fluid volumetric flow rates $\dot{V}_1$) or other optional fracking components from the corresponding tanks 140, 145, 150 to the blenders 155 by controlling valves (e.g., first valve 170 and second valve 172) coupled to flow conduits 175, 177 configured to deliver the corresponding components to the blender 155.

The term "proppant" as used herein refers to particulate solids which, during fracturing treatment of a reservoir formation, are blended with a fracturing fluid and transported downhole in a wellbore for placement within a fracture flow path to retain conductive channels in subterranean fractures through which fluids may travel. Suitable materials for proppants, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite proppants may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. In some embodiments it may be desirable to include degradable materials as at least a portion of the proppant. The mean particulate size generally may range from about 2 mesh to about 400 mesh or less on the U.S. Sieve Series; however, in certain circumstances, other sizes or mixtures of sizes may be desired and will be entirely suitable for practice of the embodiments of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention The term "fracturing fluid" as used herein refers to a base fluid and one or more optional additives. Such additives include, but are not limited to salts, weighting agents, inert solids, fluid loss control agents, emulsifiers, dispersion aids, corrosion inhibitors, emulsion thinners, emulsion thickeners, viscosifying agents, gelling agents, surfactants, particulates (such as proppant or gravel), lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof.

Suitable base fluids of the fracturing fluids include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween.

The fracturing fluid may include dispersants to control agglomeration of the particulate solids, viscosity-enhancing additives to inhibit settling and modify flow behavior, and iron control agents to prevent the precipitation of metal oxides. Other chemicals and substances may be incorporated into the fracturing fluid in order to enhance fracture treatment of the reservoir formation.

The term "hydraulic fracturing slurry" as used herein refers to a suspension of any the disclosed embodiments of proppant within any the disclosed embodiments of the fracturing fluid.

One embodiment is a method of controlling proppant concentration in a hydraulic fracturing slurry with target input values (e.g., as provided by an operator of the blending system 102) of a slurry density ($\rho_{sl\text{-}target}$) and a slurry volumetric flow rate ($\dot{V}_{sl\text{-}target}$) FIGS. 2A and 2B present a schematic flowchart of an illustrative embodiment of such a method 200 for controlling the proppant concentration in the output from a blending system of a hydraulic fracturing well system. Another embodiment is an alternative method of controlling proppant concentration in a hydraulic fracturing slurry with target input values of target slurry volumetric flow rate ($\dot{V}_{sl\text{-}target}$) and a slurry volume fraction ($C_{s\text{-}target}$), sometimes referred to as a target slurry concentration. FIGS. 3A and 3B present a schematic flowchart of an illustrative embodiment of this other method 300 for controlling the proppant concentration in the output from a blending system of a hydraulic fracturing well system. Still another embodiment is a blending system for controlling proppant concentration of a hydraulic fracturing slurry. FIG. 4 presents a schematic block diagram of an illustrative embodiment of an example blending system 102 including a blender control unit 165, which can execute any of the steps of the method 200 or alternative method 300 as further described below.

With continuing reference to FIGS. 1, 2A, 2B and 4 throughout, the method 200 includes transmitting (step 205) to a non-transient computer readable memory 405 of the blender control unit 165, target input values of a slurry density ($\rho_{sl\text{-}target}$), a slurry volumetric flow rate ($\dot{V}_{sl\text{-}target}$), and inputs of a known density of a fracturing fluid ($\rho_{fl}$) and known density of a proppant ($\rho_{pr}$). One skilled in the pertinent art would understand how the particular desired target values of $\rho_{sl\text{-}target}$ and $\dot{V}_{sl\text{-}target}$, as specified by the wellbore operator, could change during different stages of the hydraulic fracturing operation (e.g., pad stage initiates the fracturing treatment versus proppant stages versus tail-in stages) and depend on measured characteristics of the wellbore (e.g., a pressure, a change in pressure or a pressure distribution of the fracturing fluid in the wellbore, a flow rate of the fracturing fluid in the wellbore, tilt as measured by a tilt sensor proximate, distributions of wellbore temperatures, acoustic transmissions within the wellbore, lengths of flow paths or other characteristics familiar to those skilled in the pertinent arts). Similarly, one skilled in the pertinent art would understand how the known densities of $\rho_{fl}$ and $\rho_{pr}$ would depend upon the composition of the fracturing fluid and proppant chosen for the operation and how their compositions could be changed depending on the operational stage and the measured characteristics of the wellbore.

The method 200 further includes sending (step 210) from a transmitter 410 of the blender control unit 165, a command signal 412 to actuate a first valve 170 to deliver the fracturing fluid to a blender 155, and, sending (step 212) from the transmitter 410, a second command signal 414 to actuate a second valve 172 to deliver the proppant to the blender 155 (e.g., at some non-zero proppant mass flow rate, $\dot{m}_{pr}$).

The method 200 further includes measuring (step 215), using a first volume flow rate sensor ($V_1$), a volumetric flow rate ($\dot{V}_{fl}$) of the fracturing fluid input to the blender 155, and, transmitting (step 217) a signal 416 corresponding to the measured $\dot{V}_{fl}$ to a signal receiver 420 of the blender control unit 165.

The method 200 further includes measuring (step 220), using a second volume flow rate sensor ($V_2$), a volumetric flow rate ($\dot{V}_{sl}$) of the hydraulic fracturing slurry output from the blender, and, transmitting (step 222) a signal 418 corresponding to the measured $\dot{V}_{sl}$ to the signal receiver 420 of the blender control unit 165.

The method 200 further includes executing computer readable instructions (step 225), stored in the memory 405 of the blender control unit 165 to calculate, in a central processing unit 425 of the blender control unit 165: a volumetric flow rate of proppant input (V pr) to the blender according to the formula: $\dot{V}_{pr}=(\dot{V}_{sl}-\dot{V}_{fl})$, and, a slurry density ($\rho_{sl}$) according to the formula: $\rho_{sl}=(\dot{V}_{fl}\cdot\rho_{fl})+(\dot{V}_{pr}\cdot\rho_{pr}))/\dot{V}_{sl}$.

The method 200 further includes determining (step 230) in the central processing unit 425, a difference ($\Delta\rho_{sl}$) between the $\rho_{sl\text{-}target}$ and the $\rho_{sl}$, and, a difference ($\Delta\dot{V}_{sl}$) between the $\dot{V}_{sl\text{-}target}$ and the $\dot{V}_{sl}$.

The method 200 further includes in decision step (step 235), as executed in the central processing unit 425, if the $\Delta\rho_{sl}$ is not less than an acceptable slurry density margin of error (ER-$\rho_{sl}$) or the $\Delta\dot{V}_{sl}$ is not less than an acceptable slurry volumetric flow rate margin of error (ER-$\dot{V}_{sl}$), sending instructions (further actuate instruction 430, step 240) to cause the command signal 412 (sent in step 210) to further actuate the first valve 170 to incrementally change the $\dot{V}_{fl}$ or to cause the second command signal 414 (sent in step 212) to further actuate the second valve 172 to incrementally change the $\dot{m}_{pr}$. Then, as part of instruction step 240, the central processing unit sends instructions (repeat instruction 432) to repeat the measuring, transmitting and calculations of steps 215-230. The series of steps 215-240 can be repeated any number of times until both the $\Delta\rho_{sl}$ and the $\Delta\dot{V}_{sl}$ are less their acceptable margins of error ER-$\rho_{sl}$ and ER-$\dot{V}_{sl}$, respectively, at which point, the central processing unit 425 sends an output signal (target values achieved signal 435) to a display unit 440 (e.g., a computer screen, lighted button or other electrical displays familiar to those skilled in the pertinent art) of the blender control unit 165 to indicate that the target input values have been achieved.

The specific value or range of values for the acceptable margins of error ER-$\rho_{sl}$ and ER-$\dot{V}_{sl}$ can be set predefined values (e.g., ±10%, ±1% or 0.1% of the target values) or defined by the operator specifying the target values of $\rho_{sl\text{-}target}$ and $\dot{V}_{sl\text{-}target}$.

As further illustrated in FIGS. 2A and 2B, in some embodiments of the method 200, the target input values (step 205) can optionally further include a target slurry volume fraction ($C_{s\text{-}target}$). In such embodiments, the computer readable instructions executed in step 225 could include calculating a slurry volume fraction $C_s$, according to the formula: $C_s=(\dot{V}_{sl}-\dot{V}_{fl})/\dot{V}_{sl}$, determining as part of step 230 a difference ($\Delta C_s$) between the $C_{s\text{-}target}$ and the $C_s$, and deciding as part of step 235 if the $\Delta C_s$ is not less than an acceptable slurry density margin of error (ER-$C_s$). Then, as part of step 235, if the $\Delta C_s$ is not less than an acceptable slurry density margin of error (ER-$C_s$), the step 240 of sending instructions 430 to further actuate first valve 170 or second valve 172 to incrementally change the $\dot{m}_{pr}$ and, send instructions 432 to repeat the measuring, transmitting, calculating, deciding and instructing steps 215-240. In a repeating loop, steps 215-240 could be repeated any number of time until all of the $\Delta\rho_{sl}$, $\Delta\dot{V}_{sl}$ and $\Delta C_s$ are less than their respective acceptable margins of error, at which point, the central processing unit 425 ceases the loop and sends a target achieved output signal 435 to the display unit 440 (step 245).

As further illustrated in FIGS. 2A and 2B, in some embodiments of the method 200, after sending (step 210) the command signal 412 and prior to sending (step 212) the second command signal 414 a volumetric flow meter calibration step 250 can be performed. In the absence of proppant mass flow to the blender 155 $\dot{V}_{sl}$ should equal $\dot{V}_{fl}$. As part of step 250, calibrating the first volume flow rate sensor $V_1$ and the second volume flow rate sensor $V_2$ can including confirming that the volumetric flow rate value of the fracturing fluid input to the blender, as measured from the $V_1$, is substantially equal (e.g., within ±10%, 1% or 0.1% for various embodiments) to the volumetric flow rate value of the fracturing fluid output from the blender, as measured from the $V_2$. If the values from $V_1$ the $V_2$ are not substantially equal, then the calibration of one or both of the $V_1$ and $V_2$ sensor can be adjusted by means familiar to one skilled in the pertinent art to provide substantially equal readings. For example if $V_1$ reads 1 G/min more flow than $V_2$ when there is no added proppant (i.e., $\dot{m}_{pr}=0$), then it would be understood that 1 G/min would need to be subtracted 1 gpm from the calculation of proppant volume flow rate $\dot{V}_{pr}$. In some embodiments, a density sensor (D, FIGS. 1 and 4) can be used to facilitate calibration of the volumetric flow sensors, $V_1$ the $V_2$. For example, a density sensor could be used to record a reading of the steady-state density of the slurry and then the above described volumetric sensor calculation could be used to more accurately assess rapid changes in slurry concentration.

As further illustrated in FIGS. 2A and 2B, in some embodiments of the method 200, to ensure continued proper functioning of the blending system 102, the fracturing fluid flow rate $\dot{V}_{fl}$ and the proppant mass flow rate $\dot{m}_{pr}$ can be monitored and limited to ranges of values.

For example, in some embodiments, as part of step 225 the central processing unit 425 can determine a volume fraction of proponent in the hydraulic fracturing slurry ($C_s$) output from the blender according to the formula: $C_s=(\dot{V}_{sl}-\dot{V}_{fl})/\dot{V}_{sl}$ and then as part of steps 235, if the value of $C_s$ is equal to or greater than a maximum accepted slurry volume fraction, MAX-Cs (e.g., MAX-Cs equal to or greater than about 0.6, 0.5, or 0.4 in various embodiments), send instructions 430 in step 240 to cause the command signal 412 to incrementally change the $\dot{V}_{fl}$ or send instructions to cause the second command signal 414 to incrementally change the $\dot{m}_{pr}$ and then send the instructions 432 to repeat the measuring, transmitting, calculating, deciding and instructing steps 215-240.

For example, in some embodiments, as part of step 235 the central processing unit 425 can determine if the $\dot{V}_{sl}$ measured using the second volume flow rate sensor $V_2$ is less than a minimum slurry volumetric flow rate, MIN-$\dot{V}_{sl}$ (e.g., MIN-$\dot{V}_{sl}$ less than about 40, 42 or 46 G/min in various embodiments) and then as part of step 240, if the value of $\dot{V}_{sl}$ is less than MIN-$\dot{V}_{sl}$, send instructions 430 to cause the command signal 412 to incrementally change the $\dot{V}_{fl}$ or send instructions to cause the second command signal 414 to incrementally change the $\dot{m}_{pr}$ and then send the instructions 432 to repeat the steps 215-240.

In some embodiments, as part of step 240, both the $\dot{V}_{fl}$ and the $\dot{m}_{pr}$ can be simultaneously incrementally changed in parallel, while in other embodiments one of the $\dot{V}_{fl}$ or the $\dot{m}_{pr}$ is incrementally changed while the other of the $\dot{V}_{fl}$ and the $\dot{m}_{pr}$ is not changed, or in other embodiments the $\dot{V}_{fl}$ or the $\dot{m}_{pr}$ can be sequentially changed in series. For example, in some embodiments, the $\rho_{sl}$, $\dot{V}_{sl}$ and/or $C_s$ can be kept constant at the target value by using the measured volumetric flow rates $\dot{V}_{fl}$ and $\dot{V}_{sl}$ as feedback to maintain this constantancy as the the input rate of proppant, $\dot{m}_{pr}$, to the blender 155 is varied. In some such embodiments, the each of the incremental changes to the $\dot{V}_{fl}$ or to the $\dot{m}_{pr}$ can be not more than about 10 percent, or not more than about 1 percent or not more than about 0.1 percent, or some other user-defined increment. For example, in some embodiments, $\dot{V}_{fl}$ or $\dot{m}_{pr}$ can be ramped at a consistently increasing or decreasing rates (e.g., +1%/min or −1%/min) to change $v\rho_{sl}$, $\dot{V}_{sl}$ and/or $C_s$ linearly with time. For example, in some embodiments, $\dot{V}_{fl}$ or $\dot{m}_{pr}$ can be changed in steps such that there is one incremental change (e.g., a +1% or −1% change for 5 min.) for a period of time and a incremental change for a second period of time (e.g., a additional +1% or −1% change for 5 min.).

As a non-limiting example of implementing the method 200, consider a scenario where the operator of a hydraulic fracturing well system 100 transmits as part of step 205 to the non-transient computer readable memory 405 of the blender control unit 102, target input values of slurry density ($\rho_{sl\text{-}target}$) equal to 10 lb/G, slurry volumetric flow rate ($\dot{V}_{sl\text{-}target}$) equal to 50 G/min, and inputs of the known density of the fracturing fluid (p fl) equal to 8.3 lb/G (e.g., about the density of fresh water) and known density of a proppant ($\rho_{pr}$) equal to 13 lg/G (e.g., about the density of some embodiments of proppants composed of sand). Further the operator input accepted margin of errors ER-p si and ER-V si are equal to or less than ±0.1%. In such a scenario executing the method 200 would arrive at a $\dot{V}_{fl}$ equal to 31.9 G/min and second valve actuation to cause the calculated p si to equal about 10.0 lb/G (e.g., $\rho_{sl}$=((31.9 G/min·8.3 lb/G)+((50−31.9) G/min·13 lg/G))/50 G/min) and $\dot{V}_{sl}$ equal to 50.0 lb/min.

With continuing reference to FIGS. 1-4 throughout, embodiments of the method 300, similar to method 200, can include transmitting (step 305) to the non-transient computer readable memory 405 of the blender control unit 165, target input values of the slurry volumetric flow rate ($\dot{V}_{sl\text{-}target}$) and a target input value of a slurry volume fraction ($C_{s\text{-}target}$), and, transmitting the inputs of a known density of a fracturing fluid ($\rho_{fl}$) and known density of a proppant ($\rho_{pr}$). Similar to method 200, method 300 can also include sending (step 310) from the transmitter 410 of the blender control unit 165, the command signal 412 to actuate the first valve 170 to deliver the fracturing fluid to a blender 155, sending (step 312) from the transmitter 410, the second command signal 414 to actuate the second valve 172 to deliver the proppant to the blender 155, measuring (step 315), using the first volume flow rate sensor ($V_1$), the volumetric flow rate ($\dot{V}_{fl}$) of the fracturing fluid input to the blender 155, and, transmitting (step 317) the signal 416 corresponding to the measured $\dot{V}_{fl}$ to a signal receiver 420 of the blender control unit 165, and measuring (step 320), using the second volume flow rate sensor ($V_2$), a volumetric flow rate ($\dot{V}_{sl}$) of the hydraulic fracturing slurry output from the blender, and, transmitting (step 322) the signal 418 corresponding to the measured V si to the signal receiver 420 of the blender control unit 165.

The method 300 can also similarly include executing computer readable instructions (step 325), stored in the memory 405 of the blender control unit 165 to calculate, in a central processing unit 425 of the blender control unit 165 a volumetric flow rate of proppant input ($\dot{V}_{pr}$) to the blender according to the formula: $\dot{V}_{pr}=(\dot{V}_{sl}-\dot{V}_{fl})$.

The method 300 includes calculating, in a central processing unit 425, the slurry volume fraction according to the formula: $C_s=(\dot{V}_{sl}-\dot{V}_{fl})/\dot{V}_{sl}$ and determining (step 330) in the central processing unit 425, a difference ($\Delta\dot{V}_{sl}$) between the $\dot{V}_{sl\text{-}target}$ and the $\dot{V}_{sl}$ and a difference ($\Delta C_s$) between the $C_{s\text{-}target}$ and the $C_s$.

The method 300 further includes in decision step (step 335), executed in the central processing unit 425, if the $\Delta\dot{V}_{sl}$ is not less than an acceptable slurry volumetric flow rate margin of error (ER-$\dot{V}_{sl}$) or the $\Delta C_s$ is not less than an acceptable slurry volume fraction margin of error (ER-$C_s$), sending instructions (further actuate instruction 430, step 340) to cause the command signal 412 (sent in step 310) to further actuate the first valve 170 to incrementally change the $\dot{V}_{fl}$ or to cause the second command signal 414 (sent in step 312) to further actuate the second valve 172 to incrementally change the $\dot{m}_{pr}$. Then, as part of instruction step 340, the central processing unit sends instructions (repeat instruction 432) to repeat the measuring, transmitting and calculating steps 315-330. The series of steps 315-340 can be repeated any number of times until both the $\Delta C_s$ and the $\Delta\dot{V}_{sl}$ are less their acceptable margins of error ER-$C_s$ and ER-$\dot{V}_{sl}$, respectively, at which point, the central processing unit 425 sends an output signal (target values achieved signal 435) to a display unit 440 of the blender control unit 165 to indicate that the target input values have been achieved.

The method 300 can further include a volumetric flow meter calibration step 350 similar to that described in the context of FIGS. 2A and 2B for step 250, and, as part of step 335 monitoring and limiting the fracturing fluid flow rate $\dot{V}_{fl}$ and the proppant mass flow rate $\dot{m}_{pr}$ to ranges of values, e.g., to ensure that $C_s$ is equal to or greater than a maximum accepted value MAX-Cs and that the slurry volumetric flow rate does not fall below a minimum accepted value MIN-$\dot{V}_{sl}$. similar to that described in the context of FIGS. 2A and 2B for steps 230 and 235.

Any of the value of MAX-Cs (0.6, 0.5, or 0.4 in various embodiments) MIN-$\dot{V}_{sl}$, (MIN-$\dot{V}_{sl}$ less than about 40, 42 or 46 G/min), margins of errors ER-$\dot{V}_{sl}$ and (ER-$C_s$), (e.g., ±10%, ±1% or 0.1% of the target values in various embodiments) or incremental changes to $\dot{V}_{fl}$ and the $\dot{m}_{pr}$ (e.g., >10%, >1% or >0.1%, in various embodiments) described for the method 200 in the context of FIGS. 2A and 2B can be equally applicable to the method 300.

With continuing reference to FIGS. 1-4 throughout, embodiments of the blending system 102 for controlling proppant concentration of a hydraulic fracturing slurry can be configured as or include proportional-integral-derivative (PID) controllers, adaptive controllers, state-space controllers or similar control devices familiar to those skilled in the pertinent arts. The blending system includes a blender control unit 165.

The blender control unit 165 can include an input device 445 (e.g., mouse, keyboard, touch screen, or combinations of such devices). The input device 445 can be configured to accept user supplied target input values of a slurry density ($\rho_{sl\text{-}target}$), a slurry volumetric flow rate ($\dot{V}_{sl\text{-}target}$), or, a slurry volume fraction ($C_{s\text{-}target}$), and inputs of a known density of a fracturing fluid ($\rho_{fl}$) and known density of a proppant ($\rho_{pr}$).

The blender control unit 165 can include non-transient computer readable memory 405 (e.g., hard disk drive, solid state drive, removable storage drives, such as floppy disk drives, magnetic tape drives, or a compact disk drives or other binary storage media familiar to those skilled in the pertinent arts). The memory 405 is configured to store the target values of $\rho_{sl\text{-}target}$, $\dot{V}_{sl\text{-}target}$, or $C_{s\text{-}target}$ and the inputs of the known $\rho_{fl}$ and the $\rho_{pr}$ values.

Embodiments of the blender control unit 165 can include a command signal transmitter 410 (e.g., an electronic device configured for wired or wireless digital communication). The transmitter 410 can be configured to send a command signal 412 (e.g., sequences of digitally encoded signals for communication between electronic data transmitting and receiving devices, or transceiver devices, via wired or wireless telecommunication networks) to actuate a first valve 170 to deliver the fracturing fluid to a blender 155 and send a second command signal 414 to actuate a second valve 172 to deliver the proppant to the blender 155 at a non-zero proppant mass flow rate ($\dot{m}_{pr}$).

The blender control unit 165 includes a signal receiver 420 configured to a receive a signals (e.g., signals 416, 418 sent from the $V_1$ and $V_2$ sensors) corresponding to a measured volumetric flow rate ($\dot{V}_{fl}$) of the fracturing fluid input to the blender 155 and receive a signal corresponding to a measured volumetric flow rate ($\dot{V}_{sl}$) of the hydraulic fracturing slurry output from the blender.

The memory 405 is further configured to store computer readable instructions to calculate a volumetric flow rate of proppant input ($\dot{V}_{pr}$) to the blender according to the formula: $\dot{V}_{pr}=(\dot{V}_{sl}-\dot{V}_{fl})$, to calculate a slurry density ($\rho_{sl}$) according to the formula: $\rho_{sl}=((\dot{V}_{fl}\cdot\rho_{fl})+(\dot{V}_{pr}\cdot\rho_{pr}))/\dot{V}_{sl}$, and to calculate a slurry volume fraction according to the formula: $C_s=(\dot{V}_{sl}-\dot{V}_{fl})/\dot{V}_{sl}$.

The blender control unit 165 includes a central processing unit 425 (e.g., any electronic circuit capable of performing the arithmetic, logical, control and input/output (I/O) operations according to the instructions of a computer program). The central processing unit 425 is configured to read the computer readable instructions stored in the memory 405 to calculate the $\dot{V}_{pr}$ and the $\rho_{sl}$, and to determine a difference ($\Delta\dot{V}_{sl}$) between the $\dot{V}_{sl\text{-}target}$ and the $\dot{V}_{sl}$ and a difference ($\Delta\rho_{sl}$) between the $\rho_{sl\text{-}target}$ and the $\rho_{sl}$, or, to calculate the $\dot{V}_{pr}$ and the $C_s$ and to determine a difference ($\Delta\dot{V}_{sl}$) between the $\dot{V}_{sl\text{-}target}$ and the $\dot{V}_{sl}$ and a difference ($\Delta C_s$) between the $C_{s\text{-}target}$ and the $C_s$.

If $\Delta\rho_{sl}$ is not less than an acceptable slurry density margin of error (ER-$\rho_{sl}$) or the $\Delta\dot{V}_{sl}$ is not less than an acceptable slurry volumetric flow rate margin of error (ER-$\dot{V}_{sl}$), then the central processing unit 425 can be further configured, per the computer readable instructions, to send instructions 430 (e.g., digitally encoded signals) to cause the command signal 412 to further actuate the first valve 170 to incrementally change the $\dot{V}_{fl}$ or to cause the second command signal 414 to further actuate the second valve 172 to incrementally change the $\dot{m}_{pr}$. If the $\Delta\rho_{sl}$ is less than ER-$\rho_{sl}$ and the $\Delta\dot{V}_{sl}$ is less than ER-$\dot{V}_{sl}$, then central processing unit 425 can be further configured to send an output signal 435 to the display unit 440 of the blender control unit 165 to indicate that the target input values have been achieved.

Alternatively, if the $\Delta\dot{V}_{sl}$ is not less than an acceptable slurry volumetric flow rate margin of error (ER-$\dot{V}_{sl}$) or the $\Delta C_s$ is not less than an acceptable slurry density margin of error (ER-$C_s$), then central processing unit 425 can be further configured to send the instructions 430 to cause the command signal 412 to further actuate the first valve 170 to incrementally change the $\dot{V}_{fl}$ or to cause the second command signal 414 to further actuate the second valve 172 to incrementally change the $\dot{m}_{pr}$, and, if the $\Delta\dot{V}_{sl}$ is less than ER-$V_{sl}$ and the $\Delta C_s$ is less than the ER-$C_s$ then the central processing unit 425 can be configured to send the output signal 435 to the display unit 440 to indicate that the target input values have been achieved.

Embodiments of the blending system 102 can further include a blender 155 having an fluid inlet port 450 for fracturing fluid intake via a fluid input conduit 175 (e.g., steel, aluminum tubing) coupled to the fluid inlet port 450, an proppant inlet port 452 for proppant intake via a proppant input conduit 177 coupled to the proppant inlet port 452, an slurry outlet port 454 for hydraulic fracturing slurry output via a slurry output conduit 179 coupled to the slurry outlet port 454.

Embodiments of the blending system 102 can also include a first volume flow rate sensor $V_1$ coupled to the fluid input conduit 175 and configured to measure the $\dot{V}_{fl}$ of the fracturing fluid input to the blender 155 from the fluid input conduit 175 and to transmit a signal 416 corresponding to the measured $\dot{V}_{fl}$ to the signal receiver 420 of the blender control unit.

Embodiments of the blending system 102 can also include a second volume flow rate sensor $V_2$ coupled to slurry output conduit 179 and configured to measure the $\dot{V}_{sl}$ output from the blender 155 via the slurry output conduit 179 and to transmit a signal 418 corresponding to the measured $\dot{V}_{sl}$ to the signal receiver 420 of the blender control unit 165.

In any such embodiments, the first volume flow rate sensor $V_1$ or the second volume flow rate sensor $V_2$ can be configured as rotating sensors, a turbine flow sensors, differential pressure sensors, orifice flow sensors, or venture flow sensors, or other similar sensors familiar to those skilled in the pertinent arts.

Embodiments of the blending system 102 can also include a first valve 170 coupled to the fluid input conduit and configured to actuate fluid flow rates such that the $\dot{V}_{fl}$ can be incrementally adjusted, and, a second valve 172 coupled to the proppant input conduit and configured to actuate proppant mass flow rates such that a mass flow rate of the proppant to the blender ($\dot{m}_{pr}$) can be incrementally adjusted. Example embodiments of the valves 170, 172 include electrical and electromechanical valves and other types of computer controllable fluid or mass flow actuators or restrictor familiar to those skilled in the pertinent arts.

Those skilled in the art to which this application relates will appreciate that other and further additions, deletions, substitutions and modifications may be made to the described embodiments.

What is claimed is:

1. A method of controlling proppant concentration in a hydraulic fracturing slurry, comprising:

a) transmitting to a non-transient computer readable memory of a blender control unit, target input values of a slurry density ($\rho_{sl\text{-}target}$), a slurry volumetric flow rate ($\dot{V}_{sl\text{-}target}$), and inputs of a known density of a fracturing fluid ($\rho_{fl}$) and known density of a proppant ($\rho_{pr}$);

b) sending from a transmitter of the blender control unit, a command signal to actuate a first valve to deliver the fracturing fluid to a blender;

c) sending from the transmitter of the blender control unit, a second command signal to actuate a second valve to deliver the proppant to the blender at a non-zero proppant mass flow rate ($\dot{m}_{pr}$);

d) measuring, using a first volume flow rate sensor, a volumetric flow rate ($\dot{V}_{fl}$) of the fracturing fluid input to the blender and transmitting a signal corresponding to the measured $\dot{V}_{fl}$ to a signal receiver of the blender control unit;

e) measuring, using a second volume flow rate sensor, a volumetric flow rate ($\dot{V}_{sl}$) of the hydraulic fracturing slurry output from the blender and transmitting a signal corresponding to the measured $\dot{V}_{sl}$ to the signal receiver of the blender control unit;

f) executing computer readable instructions, stored in the memory of the blender control unit to calculate, in a central processing unit of the blender control unit:

a volumetric flow rate of proppant input ($\dot{V}_{pr}$) to the blender according to the formula: $\dot{V}_{pr}=(\dot{V}_{sl}-\dot{V}_{fl})$, and, a slurry density ($\rho_{sl}$) according to the formula: $\rho_{sl}=((\dot{V}_{fl}\cdot\rho_{fl})+(\dot{V}_{pr}\cdot\rho_{pr}))/\dot{V}_{sl}$;

g) determining, in the central processing unit, a difference ($\Delta\rho_{sl}$) between the $\rho_{sl\text{-}target}$ and the $\rho_{sl}$, and, a difference ($\Delta\dot{V}_{sl}$) between the $\dot{V}_{sl\text{-}target}$ and the $\dot{V}_{sl}$; and then h) if the $\Delta\rho_{sl}$ is not less than an acceptable slurry density margin of error (ER-$\rho_{sl}$) or the $\Delta\dot{V}_{sl}$ is not less than an acceptable slurry volumetric flow rate margin of error (ER-$\dot{V}_{sl}$), the central processing unit sends instructions to cause the command signal to further actuate the first valve to incrementally change the $\dot{V}_{fl}$ or sends instructions to cause the second command signal to further actuate the second valve to incrementally change the $\dot{m}_{pr}$, and then the central processing unit send instructions to cause steps (d)-(h) to be repeated, and i) if the $\Delta\rho_{sl}$ is less than ER-$\rho_{sl}$ and the $\Delta\dot{V}_{sl}$ is less than ER-$\dot{V}_{sl}$, then the central processing unit sends an output signal to a display unit of the blender control unit to indicate that the target input values have been achieved.

2. The method of claim 1, further including:

the transmitting of step (a) includes the target input value of a slurry volume fraction ($C_{s\text{-}target}$);

the executing of computer readable instructions of step (f) includes calculating a slurry volume fraction according to the formula: $C_s=(\dot{V}_{sl}-\dot{V}_{fl})/\dot{V}_{sl}$;

step (g) includes determining difference ($\Delta C_s$) between the $C_{s\text{-}target}$ and the $C_s$; and then as part of step (h), if the $\Delta C_s$ is not less than an acceptable slurry density margin of error (ER-$C_s$), then the central processing unit sends instructions to cause the command signal to further actuate the first valve to incrementally change the $\dot{V}_{fl}$ or to cause the second command signal to further actuate the second valve to incrementally change the $\dot{m}_{pr}$, and then the central processing unit repeats steps (d)-(f), and as part of step (i), if the $\Delta C_s$ is less than the ER-$C_s$, then the central processing unit sends an output signal to a display unit of the blender control unit to indicate that the target input values have been achieved.

3. The method of claim 1, further including: after step (b) and prior to step (c), calibrating the first volume flow rate sensor and the second volume flow rate sensor including confirming that the volumetric flow rate value of the fracturing fluid input to the blender, as measured from the first volume flow rate sensor, is substantially equal to the volumetric flow rate value of the fracturing fluid output from the blender, as measured from the second volume flow rate sensor.

4. The method of claim 1, further including:

as part of step (g), determining a volume fraction of proponent in the hydraulic fracturing slurry (C s) output from the blender according to the formula: $C_s=(\dot{V}_{sl}-\dot{V}_{fl})/\dot{V}_{sl}$ and then as part of step (h), if the value of C s is equal to or greater than a maximum accepted slurry volume fraction (MAX-Cs), send instructions to cause the command signal to incrementally change the $\dot{V}_{fl}$ or send instructions to cause the second command signal to incrementally change the $\dot{m}_{pr}$ and then repeat the steps (d)-(f).

5. The method of claim 4, wherein the MAX-Cs equals about 0.50.

6. The method of claim 1, further including:

as part of step (h), determining if the $\dot{V}_{sl}$ measured using the second volume flow rate sensor is less than a minimum slurry volumetric flow rate (MIN-$\dot{V}_{sl}$) and then as part of step (h), if the value of $\dot{V}_{sl}$ is less than MIN-$\dot{V}_{sl}$ send instructions to cause the command signal to incrementally change the $\dot{V}_{sl}$ or send instructions to cause the second command signal to incrementally change the $\dot{m}_{pr}$ and then repeat the steps (d)-(f).

7. The method of claim 6, wherein MIN-$\dot{V}_{sl}$ equals about 42 G/min.

8. The method of claim 1, wherein as part of step (h) both the $\dot{V}_{fl}$ and the $\dot{m}_{pr}$ are incrementally changed.

9. The method of claim 1, wherein the incremental change to the $\dot{V}_{fl}$ is not more than 10 percent.

10. The method of claim 1, wherein the incremental change to the $\dot{m}_{pr}$ is not more than 10 percent.

11. A method of controlling proppant concentration in a hydraulic fracturing slurry, comprising:

a) transmitting to a non-transient computer readable memory of a blender control unit, a target slurry volumetric flow rate ($\dot{V}_{sl\text{-}target}$), a target input value of a slurry volume fraction ($C_{s\text{-}target}$), and inputs of a known density of a fracturing fluid ($\rho_{fl}$) and known density of a proppant ($\rho_{pr}$);

b) sending from a transmitter of the blender control unit, a command signal to actuate a first valve to deliver the fracturing fluid to a blender;

c) sending from the transmitter of the blender control unit, a second command signal to actuate a second valve to deliver the proppant to the blender at a non-zero proppant mass flow rate ($\dot{m}_{pr}$);

d) measuring, using a first volume flow rate sensor, a volumetric flow rate ($\dot{V}_{fl}$) of the fracturing fluid input to the blender and transmitting a signal corresponding to the measured $\dot{V}_{fl}$ to a signal receiver of the blender control unit;

e) measuring, using a second volume flow rate sensor, a volumetric flow rate ($\dot{V}_{sl}$) of the hydraulic fracturing slurry output from the blender and transmitting a signal corresponding to the measured $\dot{V}_{sl}$ to the signal receiver of the blender control unit;

f) executing computer readable instructions, stored in the memory of the blender control unit to calculate, in a central processing unit of the blender control unit a volumetric flow rate of proppant input ($\dot{V}_{pr}$) to the blender according to the formula: $\dot{V}_{pr}=(\dot{V}_{sl}-\dot{V}_{fl})$, and, a slurry volume fraction according to the formula: $C_s=(\dot{V}_{sl}-\dot{V}_{fl})/\dot{V}_{sl}$;

g) determining, in the central processing unit, a difference ($\Delta\dot{V}_{sl}$) between the $\dot{V}_{sl\text{-}target}$ and the $\dot{V}_{sl}$, and, a difference ($\Delta C_s$) between the $C_{s\text{-}target}$ and the $C_s$; and then h) if the $\Delta\dot{V}_{sl}$ is not less than an acceptable slurry volumetric flow rate margin of error (ER-$\dot{V}_{sl}$) or the $\Delta C_s$ is not less than an acceptable slurry volume fraction margin of error (ER-$C_s$), then the central processing unit sends instructions to cause the command signal to further actuate the first valve to incrementally change the $\dot{V}_{fl}$ or to cause the second command signal to further actuate the second valve to incrementally change the $\dot{m}_{pr}$, and then the central processing unit repeats steps (d)-(h), and i) if the $\Delta\dot{V}_{sl}$ is less than ER-$\dot{V}_{sl}$ and the $\Delta C_s$ is less than the ER-$C_s$, then the central processing unit sends an output signal to a display unit of the blender control unit to indicate that the target input values have been achieved.

12. A blending system for controlling proppant concentration of a hydraulic fracturing slurry, comprising:

blender control unit, the blender control unit including:

an input device configured accept target input values of a slurry density ($\rho_{sl\text{-}target}$) a slurry volumetric flow rate ($\dot{V}_{sl\text{-}target}$), or, a slurry volume fraction ($C_{s\text{-}target}$), and inputs of a known density of a fracturing fluid ($\rho_{fl}$) and known density of a proppant ($\rho_{pr}$);

a command signal transmitter configured to send a command signal to actuate a first valve to deliver the fracturing fluid to a blender and send a second command signal to actuate a second valve to deliver the proppant to the blender at a non-zero proppant mass flow rate ($\dot{m}_{pr}$);

a signal receiver configured to a receive a signal corresponding to a measured volumetric flow rate ($\dot{V}_{fl}$) of the fracturing fluid input to the blender and receive a signal corresponding to a measured volumetric flow rate ($\dot{V}_{sl}$) of the hydraulic fracturing slurry output from the blender;

a non-transient computer readable memory configured to store the target values of $\rho_{sl\text{-}target}$, $\dot{V}_{sl\text{-}target}$, or $C_{s\text{-}target}$ and the inputs of the $\rho_{fl}$ and the $\rho_{pr}$ and to store computer readable instructions to calculate a volumetric flow rate of proppant input (V pr) to the blender according to the formula: $\dot{V}_{pr}=(\dot{V}_{sl}-\dot{V}_{fl})$, to calculate a slurry density ($\rho_{sl}$) according to the formula: $\rho_{sl}=((\dot{V}_{fl}\cdot\rho_{fl})+(\dot{V}_{pr}\cdot\rho_{pr}))/\dot{V}_{sl}$, and to calculate a slurry volume fraction according to the formula: $C_s=(\dot{V}_{sl}-\dot{V}_{fl})/\dot{V}_{sl}$; and a central processing unit configured to:

read the computer readable instructions and to calculate:

the $\dot{V}_{pr}$ and the $\rho_{sl}$, and to determine a difference ($\Delta\dot{V}_{sl}$) between the $\dot{V}_{sl\text{-}target}$ and the $\dot{V}_{sl}$ and a difference ($\Delta\rho_{sl}$) between the $\rho_{sl\text{-}target}$ and the $\rho_{sl}$, or, to calculate:

the $\dot{V}_{pr}$ and the $C_s$ and to determine a difference ($\Delta\dot{V}_{sl}$) between the $\dot{V}_{sl\text{-}target}$ and the $\dot{V}_{sl}$ and a difference ($\Delta C_s$) between the $C_{s\text{-}target}$ and the $C_s$, and then:

if the $\Delta\rho_{sl}$ is not less than an acceptable slurry density margin of error (ER-$\dot{V}_{sl}$) or the $\Delta\dot{V}_{sl}$ is not less than an acceptable slurry volumetric flow rate margin of error (ER-$\dot{V}_{sl}$), then send instructions to cause the command signal to further actuate the first valve to incrementally change the $\dot{V}_{fl}$ or to cause the second command signal to further actuate the second valve to incrementally change the $\dot{m}_{pr}$ and if the $\Delta\rho_{sl}$ is less than ER-$\rho_{sl}$ and the $\Delta\dot{V}_{sl}$ is less than ER-$\dot{V}_{sl}$, then send an output signal to a display unit of the blender control unit to indicate that the target input values have been achieved, or, if the $\Delta\dot{V}_{sl}$ is not less than an acceptable slurry volumetric flow rate margin of error (ER-$\dot{V}_{sl}$) or the $\Delta C_s$ is not less than an acceptable slurry density margin of error (ER-$C_s$), then send instructions to cause the command signal to further actuate the first valve to incrementally change the $\dot{V}_{fl}$ or to cause the second command signal to further actuate the second valve to incrementally change the $\dot{m}_{pr}$ and if the $\Delta\dot{V}_{sl}$ is less than ER-$\dot{V}_{sl}$ and the $\Delta C_s$ is less than the ER-$C_s$, then the central processing unit sends an output signal to a display unit of the blender control unit to indicate that the target input values have been achieved.

13. The blending system of claim 12, further including the blender, the blender including:

an fluid inlet port for fracturing fluid intake via a fluid input conduit coupled to the fluid inlet port, an proppant inlet port for proppant intake via a proppant input conduit coupled to the proppant inlet port, and an slurry outlet port for hydraulic fracturing slurry output via a slurry output conduit coupled to the slurry outlet port.

14. The blending system of claim 13, further including a first volume flow rate sensor coupled to the fluid input conduit and configured to measure the $\dot{V}_{fl}$ of the fracturing fluid input to the blender from the fluid input conduit and to transmit a signal corresponding to the measured $\dot{V}_{fl}$ to the signal receiver of the blender control unit.

15. The blending system of claim 14, wherein the first volume flow rate sensor is configured as a rotating sensor, a turbine flow sensor, a differential pressure sensor, an orifice flow sensor, or venture flow sensor.

16. The blending system of claim 13, further including a second volume flow rate sensor coupled to the slurry output conduit and configured to measure the $\dot{V}_{sl}$ of the hydraulic fracturing slurry output from the blender via the slurry output conduit and to transmit a signal corresponding to the measured $\dot{V}_{sl}$ to the signal receiver of the blender control unit.

17. The blending system of claim 16, wherein the second volume flow rate sensors is configured as a rotating sensor, a turbine flow sensor, a differential pressure sensor, an orifice flow sensor, or venture flow sensor.

18. The blending system of claim 13, further including a first valve coupled to the fluid input conduit and configured to actuate fluid flow such that the Vii can be incrementally adjusted.

19. The blending system of claim 13, further including a second valve coupled to the proppant input conduit and configured to actuate mass flow such that a mass flow rate of the proppant to the blender ($\dot{m}_{pr}$) can be incrementally adjusted.

20. The blending system of claim 12, wherein the blender control unit is configured as PID controller, an adaptive controller, or a state-space controller.

* * * * *